United States Patent [19]

Raghava et al.

[11] 4,311,804
[45] Jan. 19, 1982

[54] PROCESS FOR THE PREPARATION OF A FULLY HYDROLYZED POLYVINYL ALCOHOL MODIFIED MELAMINE-FORMALDEHYDE RESIN FOR APPLICATION IN DECORATIVE LAMINATES

[75] Inventors: Ram S. Raghava, Ann Arbor, Mich.; Calvin Richardson, Cincinnati, Ohio

[73] Assignee: Formica Corporation, Cincinnati, Ohio

[21] Appl. No.: 202,110

[22] Filed: Oct. 30, 1980

Related U.S. Application Data

[63] Continuation-in-part of Ser. No. 46,144, Jun. 6, 1979, abandoned.

[51] Int. Cl.³ .............................................. C08L 61/28
[52] U.S. Cl. ...................... 525/58; 260/17.3; 428/511
[58] Field of Search ............. 525/58; 260/29.4 UA, 260/17.3; 428/511

[56] References Cited

U.S. PATENT DOCUMENTS 3,458,465  7/1969  Rehnelt et al. ................ 260/29.4
4,138,445  2/1979  Nogi et al. ......................... 525/58

FOREIGN PATENT DOCUMENTS 508086  12/1954  Canada.
855536  12/1960  United Kingdom.

Primary Examiner—Theodore E. Pertilla
Attorney, Agent, or Firm—Paul W. Leuzzi, II

[57] ABSTRACT

A process for preparing a fully hydrolyzed polyvinyl alcohol modified melamine-formaldehyde resin useful in decorative laminates is disclosed. The process comprises reacting melamine, formaldehyde, and fully hydrolyzed polyvinyl alcohol at 80°–90° C. until the reaction product has a water tolerance of about 300% to 1000% in 5° C. water. The mole ratio of melamine to formaldehyde is from about 1:1.5 to about 1:1.8, respectively.

5 Claims, No Drawings

PROCESS FOR THE PREPARATION OF A FULLY HYDROLYZED POLYVINYL ALCOHOL MODIFIED MELAMINE-FORMALDEHYDE RESIN FOR APPLICATION IN DECORATIVE LAMINATES

CROSS REFERENCE TO RELATED APPLICATION

This application is a continuation-in-part application of application Ser. No. 46,144, filed June 6, 1979, now abandoned.

Melamine-formaldehyde resins are the conventional resins used in the decorative laminate industry as impregnants in alpha-cellulose overlay sheets which are used to protect the laminate surface from abrasion. The cured melamine-formaldehyde resins are colorless and resistant to light; they are likewise resistant to a variety of solvents and stains; and their heat resistance makes them immune to burning cigarettes, boiling water and heated containers up to about 325° F. Without these melamine-formaldehyde resins the decorative laminate industry would not exist as it is known today. However, because these resins are extremely brittle, they sometimes require reinforcement.

In the British Pat. No. 855,536 issued to the American Cyanamid Company in 1959, a process for preparing a modified melamine-formaldehyde resin was disclosed. This process consisted of modifying the melamine-formaldehyde resin with a partially hydrolyzed polyvinyl alcohol resin to overcome the brittleness of the melamine-formaldehyde resins. The partially hydrolyzed polyvinyl alcohol modified melamine-formaldehyde resin produced according to this reference resulted in a resin which possessed poor craze and crack resistance upon curing, as well as a very short shelf-life (time lapse before gelation).

In U.S. Pat. No. 3,458,465 issued to Rechnelt et al. in 1969, partially hydrolyzed polyvinyl alcohol and polyvinyl acetate were employed to modify conventional melamine-formaldehyde resins. Again, however, the resin produced possessed poor craze and crack resistance upon curing and too short of a shelf-life for it to be commercially acceptable for use in laminates.

Thus, there exists a need for a process for the manufacture of a modified melamine-formaldehyde resin which imparts a substantially clear finish to a laminate, has a commercially acceptable shelf-life, exhibits improved craze and crack resistance upon curing, and tempers the brittleness of unmodified melamine-formaldehyde resins.

SUMMARY OF THE INVENTION

The present invention provides for a process of preparing a fully hydrolyzed polyvinyl alcohol (PVA) modified melamine-formaldehyde resin. The process provides a clear, resistant resin that possesses a shelf-life acceptable for commercial applications.

DETAILED DESCRIPTION OF THE INVENTION

In accordance with the present invention, there is provided a process of preparation for a fully hydrolyzed polyvinyl alcohol modified melamine-formaldehyde resin which comprises (a) initiating a reaction between melamine and formaldehyde, under alkaline conditions, wherein the mole ratio of melamine to formaldehyde is from about 1:1.5 to about 1:1.8, respectively; (b) adding, upon the occurrence of a clear melamine-formaldehyde resin product, a fully hydrolyzed polyvinyl alcohol in an amount such that the fully hydrolyzed polyvinyl alcohol constitutes from about 5% to 30%, on a weight basis, of the total weight of the melamine-formaldehyde reaction product solids; (c) maintaining the reaction at a temperature between 80° C. to 90° C.; and (d) terminating the reaction when the reaction products have a water tolerance, in 5° C. water, between 300% and 1000%.

The polyvinyl alcohol is employed as a plasticizer with considerable ductility whose particles in the brittle matrix of the melamine-formaldehyde resin provide for a toughening of the thus-modified resin. The fully hydrolyzed PVA is required over the partially hydrolyzed PVA for use in the melamine-formaldehyde resin because the partially hydrolyzed PVA modified melamine-formaldehyde has exhibited too short of a shelf-life (time lapse before gelation) for practical purposes, even when stabilizers have been added. Fully hydrolyzed PVA is commercially available for use in the present invention. The fully hydrolyzed PVA employed in the coating layer generally will not be prepared by hydrolysis of polyvinyl alcohols in the conventional manner. Instead, the fully hydrolyzed PVA is the product of fully hydrolyzing a polyvinyl ester, such as polyvinyl acetate or polyvinyl formate. This procedure is more effective, less costly, and results in a polyvinyl alcohol having a degree of hydrolysis equal to or greater than about 99.0 percent of the acetate groups on a dry basis. However, the term "fully hydrolyzed PVA" is generally recognized in the trade to apply to this highly hydrolyzed polyvinyl ester, and as such will continue to be applied herein.

In preparing the fully hydrolyzed PVA modified melamine-formaldehyde resin of the present invention, the first stage in the preparation of this resin is the reaction between melamine and formaldehyde. Although, the fully hydrolyzed PVA may be added during the reaction of the melamine and formaldehyde, it is preferrable to add the fully hydrolyzed PVA after the initial stage has proceeded sufficiently to produce a clear reaction product. The mole ratio of melamine to formaldehyde can be varied from about 1:1.5 to about 1:1.8, respectively, preferably about 1:1.6 melamine to formaldehyde, respectively. The reaction is carried out in an aqueous dispersion or solution. To facilitate this aqueous phase reaction, aqueous formaldehyde solutions commercially available are employed in the preparation of the modified resin.

The reaction between melamine and formaldehyde occurs under alkaline conditions. The preferred pH range of the reaction is 7.5 to 10. For this purpose, a buffering material to control the pH is employed. One such buffering agent that may be advantageously used is triethanolamine, although the present invention is not limited to this particular buffering material. The buffering agent may be employed during the initial stages of the reaction, during both the initial stage and the modification stage, or not at all.

During the initial stage of the melamine-formaldehyde reaction, the reaction temperature is not critical although lower temperatures, such as room temperature, cause the reaction to progress rather slowly. At this point, the fully hydrolyzed PVA may be added to the reaction preferably, however, the fully hydrolyzed PVA is added when the reaction products appear clear.

The amount of fully hydrolyzed PVA to be employed may vary from about 5% to 30% on a weight basis of the total weight of the melamine-formaldehyde reaction product solids. It is generally preferred, however, that the fully hydrolyzed PVA added be in an amount of from about 10% to 20% on a weight basis of the total weight of the melamine-formaldehyde reaction product solids. It is likewise preferred that during the reaction between the fully hydrolyzed PVA and the melamine-formaldehyde resin, a reaction temperature ranging from about 80° C. to 90° C. should be maintained. The reaction should continue until the percent water tolerance of the reaction ranges from about 300% to about 1000% in 5° C. water. The expression, percent water tolerance, is a well-known term in the resin art and simply means that a sample of resin can be diluted in a certain percent of its volume without displaying any milkiness, i.e., 300% water tolerance at 5° C. indicates that the given sample can be diluted in three times its volume of 5° C. water without displaying any milkiness. After the reaction product has reached the desired endpoint, it is cooled to ambient temperature and stored for use. The resin produced generally is not viscous enough for coating purposes and penetrates the paper during subsequent coating operations thus a small amount of a thickening agent, such as carboxyl methyl cellulose, sodium alginate or the like may be added with the other constituents during the reaction to correct this result. Additionally, stabilizers may be added to extend the shelf-life of the resin.

To further increase the resin viscosity, a small amount of a catalyst can be added before the impregnation or coating operations. The catalyst should not be added earlier, however, because to do so adversely affects the shelf-life of the modified resin so produced.

The fully hydrolyzed PVA modified melamine-formaldehyde resin may be impregnated into or coated onto cellulosic paper sheets and then cured to produce a laminate. During the coating operation "fisheye" like formations often occur resulting in a non-uniform thickness and hence non-uniform wear. To alleviate this problem, a surfactant can be added to the resin prior to the coating stage.

The following specific examples illustrate certain aspects of the present invention and, more particularly, point out methods of evaluating the unique advantages the modified resin produced by the process of the present invention provides. However, the examples are set forth for illustration only and are not to be construed as limitations on the present invention except as set forth in the appended claims. All parts and percentages are by weight unless otherwise specified.

EXAMPLE 1

Into a suitable reaction vessel equipped with a thermometer, stirrer and reflux condenser there are introduced 568 parts of melamine and 658 parts of a 37% aqueous solution of formaldehyde. The mixture is adjusted to a pH of 9.0 by the addition of 25 parts of triethanolamine. The charge is subjected to constant agitation as it is concurrently heated to 85° C. The temperature is held constant at this point until the resin so produced appears clear. Upon the resin appearing clear there is added 715 parts of a 20% solution of fully hydrolyzed polyvinyl alcohol in water. The temperature is maintained at 85° C. while water tolerance is constantly monitored in 5° C. water. Upon achieving a water tolerance of 500%, the mixture is cooled to room temperature and is ready for laminating use. Observations are given in Table I.

EXAMPLE 2

The procedure of Example 1 is followed in every material detail except that the fully hydrolyzed polyvinyl alcohol is added at the initial stage along with the melamine and formaldehyde. Observations are given in Table I.

EXAMPLE 3

The procedure of Example 1 is followed in every material detail except that the melamine-formaldehyde resin is allowed to react at room temperature until it is clear. Observations are given in Table I.

EXAMPLE 4

The procedure of Example 1 is followed in every material detail except that the magnitudes of the resin constituents are as follows: 504 parts of melamine, 871 parts of a 37% aqueous solution of formaldehyde, 32 parts of triethanolamine and enough water to bring the total solids content to 50%. Observations are given in Table I.

COMPARATIVE EXAMPLE A

The procedure of Example 1 is followed in every material detail except that a partially hydrolyzed polyvinyl alcohol is used in place of the fully hydrolyzed polyvinyl alcohol. Percent hydrolysis was 85.5–88.7%. Observations are given in Table I.

TABLE I

| Example | pH | Shelf-Life* |
| --- | --- | --- |
| 1 | 9.0 | 14 days |
| 2 | 9.2 | 10 days |
| 3 | 9.0 | 14 days |
| 4 | 9.0 | 14 days |
| Comparative A | 8.7 | 4 days |

*Time lapse before gelation.

EXAMPLE 5

An alpha-cellulose print paper is impregnated with a conventional melamine-formaldehyde resin to 20% resin solids of the impregnated sheet and thereafter the print sheet is coated with a layer of the fully hydrolyzed polyvinyl alcohol modified melamine-formaldehyde resin of Example 1. The coated print paper is dried to a 6.0% volatile content and cut into sheets of suitable size.

EXAMPLE 6

The procedure of Example 5 is followed in every material detail except that the fully hydrolyzed polyvinyl alcohol modified melamine-formaldehyde resin of Example 1 has 0.06% of a commercially available surfactant added to it to prevent a surface "fisheye" appearance.

EXAMPLE 7

A commercially available kraft paper is impregnated with a conventional phenol-formaldehyde laminating resin content of 29%. The impregnated paper is then dried to a volatile content of 6.0% and cut into sheets of suitable size. Five such sheets are assembled together to form a core layer.

An alpha cellulose print paper impregnated with a conventional melamine-formaldehyde resin to 40% resin solids is coated following the procedure of Example 5 in every material detail. This coated print paper is then laid upon the laminate core with the coated side facing upwardly. The entire assembly is then pressed between polished stainless steel plates for 21 minutes at 145° C. and 1400 psi. The pressed laminate is cooled and removed from the press. The resultant laminate meets the requirements of NEMA for high-pressure decorative laminates.

EXAMPLES 8-10

The procedure of Example 7 is followed in every material detail in each instance, except that the coating resin used was that produced in Examples 2-4, respectively. The resultant laminates meet the requirements of NEMA for high-pressure decorative laminates.

EXAMPLES 11-14

The procedure of Example 7 is followed in every material detail, in each instance, except that the alpha-cellulose print paper is coated following the procedure of Example 6 and that the coating resin used was that produced in Examples 1-4, respectively. The resultant laminates meet the requirements of NEMA for high-pressure decorative laminates.

We claim:

1. A process for preparation for a hydrolyzed polyvinyl alcohol modified melamine-formaldehyde resin having improved shelf life which comprises:
   (a) initiating a reaction between melamine and formaldehyde under alkaline conditions, wherein the mole ratio of melamine to formaldehyde is from about 1:1.5 to about 1:1.8, respectively;
   (b) adding, upon the occurrence of a clear melamine-formaldehyde reaction product, a hydrolyzed polyvinyl alcohol having a degree of hydrolysis equal to or greater than about 99.0 percent of the acetate groups in an amount such that the hydrolyzed polyvinyl alcohol constitutes from about 5% to 30%, on a weight basis, of the total weight of the melamine-formaldehyde reaction product solids;
   (c) maintaining the reaction at a temperature between 80° C. to 90° C., and
   (d) terminating the reaction when the reaction products have a water tolerance, in 5° C. water, between 300% and 1000%.

2. The process of claim 1 wherein the hydrolyzed polyvinyl alcohol is added together with the melamine and formaldehyde at the initiation stage.

3. A hydrolyzed polyvinyl alcohol modified melamine-formaldehyde resin having improved shelf life, comprising the reaction product of melamine-formaldehyde and hydrolyzed polyvinyl alcohol having a degree of hydrolysis equal to or greater than about 99.0 percent of the acetate groups wherein the molar ratio of melamine to formaldehyde is about 1:1.5 to about 1:1.8, respectively and the hydrolyzed polyvinyl alcohol comprises from about 5 to 30 percent by weight of the total weight of the melamine-formaldehyde reaction product solids.

4. The resin of claim 3 wherein an effective amount of a thickening agent is added.

5. The resin of claim 3 wherein an effective amount of a surfactant is added.

* * * * *